US006615569B1

(12) United States Patent
Carlz (10) Patent No.: US 6,615,569 B1
(45) Date of Patent: Sep. 9, 2003

(54) CONTROL SYSTEM TO AUTOMATICALLY CENTER AN AGRICULTURAL HARVESTER HEADER

(75) Inventor: Randall J. Carlz, Bettendorf, IA (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/412,192

(22) Filed: Oct. 5, 1999

(51) Int. Cl.[7] ........................... A01D 67/00; A01B 63/00
(52) U.S. Cl. ........................ 56/10.2 E; 56/208; 172/2; 701/50
(58) Field of Search ................... 56/10.2 D, 10.2 E, 56/208, DIG. 15, 10.2 R; 172/2, 4, 4.5; 701/50; 37/348

(56) References Cited

U.S. PATENT DOCUMENTS

| | | | |
|---|---|---|---|
| 3,698,164 A | * 10/1972 | Boone et al. | 56/10.4 |
| 4,166,506 A | * 9/1979 | Tezuka et al. | 172/4.5 |
| 4,437,295 A | * 3/1984 | Rock | 56/10.2 |
| 4,776,153 A | * 10/1988 | DePauw et al. | 56/10.2 |
| 4,934,463 A | * 6/1990 | Ishida et al. | 172/4.5 |
| 5,000,650 A | * 3/1991 | Brewer et al. | 414/699 |
| 5,155,984 A | 10/1992 | Sheehan | 56/10.2 E |
| 5,359,836 A | 11/1994 | Zeuner et al. | 56/10.2 E |
| 5,398,766 A | * 3/1995 | Nakayama et al. | 172/4.5 |
| 5,473,870 A | * 12/1995 | Panoushek et al. | 56/10.2 E |
| 5,535,577 A | 7/1996 | Chmielewski et al. | 56/10.2 E |
| 5,685,377 A | * 11/1997 | Arstein et al. | 172/2 |
| 5,704,200 A | 1/1998 | Chmielewski, Jr. et al. | 56/10.2 E |

OTHER PUBLICATIONS

Case Corporation, Service Bulletin, AG Equipment Binder, Mach Loc Code 46038, Sep. 23, 1996, pp. 1–23, 38A–40.

* cited by examiner

Primary Examiner—Thomas B. Will
Assistant Examiner—Nathan Mammen
(74) Attorney, Agent, or Firm—John William Stader; Larry W. Miller (57) ABSTRACT

A control system for an agricultural harvester having a frame and a header. The header attaches to a feeder which connects the header to the harvester, and header to feeder attaching point has a position which is adjustable relative to the frame. In at least one mode, when an operator raises the feeder above a predetermined height, the control system automatically levels the header to the frame of the harvester, even though the header was being operated manually in a lowered position. The control system includes a feeder housing limit switch that indicates when the operator raises the feeder above a predetermined height. When operating in the automatic centering mode, the header tilt control module compares the centering signal and the balance signal to automatically level the header relative to the frame of the harvester.

13 Claims, 5 Drawing Sheets

CONTROL SYSTEM TO AUTOMATICALLY CENTER AN AGRICULTURAL HARVESTER HEADER

FIELD OF THE INVENTION

The present invention relates generally to agricultural equipment, and more specifically to a field tracking control system for controlling a header position of an agricultural harvester.

BACKGROUND OF THE INVENTION

To harvest crops, agricultural harvesters such as combines and forage harvesters utilize a header that contains a cutting mechanism. The cutting mechanism cuts the crops and the header channels the crops to a feeder. The header attaches onto the feeder which conveys the crops to the harvester. A feeder adapter connects the header to the feeder which couples to the harvester. To laterally tilt the feeder left to right, a field tracking cylinder is mechanically attached between the feeder and the feeder adapter. The field tracking cylinder extends and retracts, typically due to hydraulics, to tilt the feeder adapter, which in turn tilts the header relative to a frame of the harvester and to the ground.

To control the position of the header during operation of the harvester, some harvesters employ a control system, such as the Field Tracker® control system manufactured by the Hart Carter Corporation (HCC). Control systems offer both automatic and manual mode operations to give an operator flexibility in operating the equipment.

Operation in the automatic mode allows the header to automatically tilt side to side, independently of the harvester, to closely follow a ground contour which may be uneven or sloped. In the automatic mode, the header is lowered close to the ground to harvest short crops, such as soybeans. As the harvester moves forward, the header is automatically tilted side to side to follow the ground contour. At the end of each run, the header is raised so that the harvester may be rapidly driven and positioned at the next row. When raised, the header is automatically leveled with the harvester. After the harvester is turned around, the header is again lowered to start the next run.

Manual mode operation, on the other hand, allows the operator to position the header higher to harvest taller crops. In the manual mode, the operator manually controls the angle of the header relative to the harvester to follow the contours of the ground. At the end of each run, the header is raised but not automatically leveled with the harvester. Therefore, when the header is raised at the end of the run, the header may be at an angle with respect to the harvester.

A problem exists in that the operator must manually level the header to the harvester before starting a next run. The operator, who is in the cab of the harvester, cannot easily determine when the header is level to the harvester. Therefore, the operator is not assured that the header is in a known position for transport and for resuming harvesting.

Accordingly, it is a primary object of the present invention to provide an improved field tracking control system.

It is another object to provide a field tracking control system which obtains automatic centering of the harvester's header when the header is lifted when harvesting in a manual mode.

It is still another object to provide a control system with a manual/auto-center mode which allows an operator to manually control the angle of the header to conform to the terrain, and at the end of each run automatically level the header to the harvester when the header is raised.

Other objects and advantages will become apparent upon reading the following detailed description, in conjunction with the attached drawings.

SUMMARY OF THE INVENTION

Generally, a field tracking control system for controlling a header of an agricultural harvester provides operation in both manual and automatic modes. In addition, the field tracking control system provides automatic leveling of the header, even when in the manual harvesting mode.

In one aspect of the invention a field tracking control system includes a header tilt control module to control a feeder's lateral tilt. A self centering operation of the header tilt control module is activated when the harvester is operated in the automatic or the manual/auto-center modes and the feeder is raised above a predetermined height. In the manual/auto-center mode, a feeder housing limit switch is used to activate the self centering operation of the header tilt control module. During the self centering operation, the header tilt control module compares a self-centering signal and a fixed signal to determine when the header is level relative to the frame of the harvester. If the feeder is not level to the harvester, the header tilt control module operates to automatically level the feeder to the harvester's frame.

BRIEF DESCRIPTION OF THE DRAWINGS

Other features and advantages of the invention will be apparent to those skilled in the art with reference to the detailed description and the drawings, of which.

DETAILED DESCRIPTION OF THE INVENTION

In addition to automatic and manual modes, the present invention includes a manual/auto-center mode to assist the operator in controlling a header of the harvester. The manual/auto-center mode automatically levels the harvester's header to the harvester frame without operator intervention. During a run in the manual/auto-center mode, the operator manually controls the angle of the header to conform to the terrain. Importantly, when the header is raised at the end of each run, the header is automatically leveled with the harvester. Therefore, before the start of the next run, the operator avoids difficult manual adjustment of the lateral angle of the header relative to the harvester.

Figure 1:
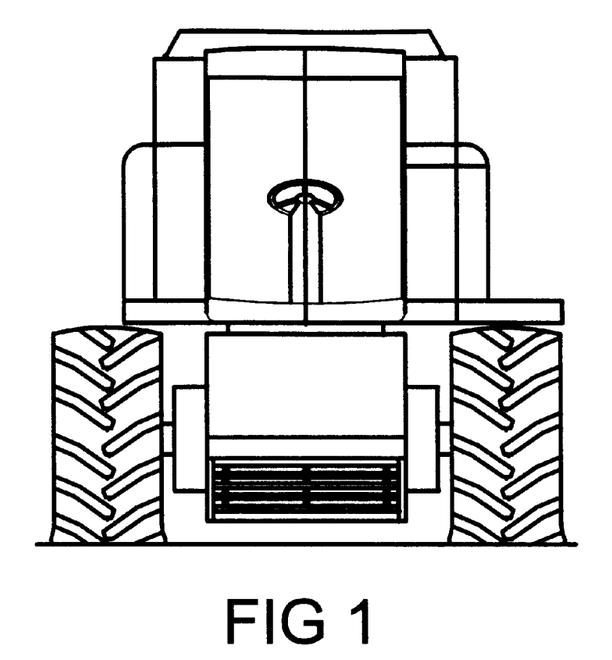
FIG. 1 is a front view of a harvester with a feeder in a level position according to the field tracking control system of the present invention.

Referring to the drawings, and particularly FIG. 1, a harvester, indicated generally as 10, includes a feeder adapter 12 and a cab 14. An operator sits in the cab 14 to maneuver the harvester 10 through a field to harvest crops, e.g., wheat, soybeans and corn. A header (not shown) attaches to a feeder (not shown) via the feeder adapter 12. The header includes a cutter mechanism to harvest the crops. The feeder conveys the cut crops to the harvester 10.

The operator maintains the header in a desired position relative to the ground that maximizes the yield of the crop being harvested. For example, for a low lying crop like soybeans, the operator positions the header near the ground to obtain the maximum yield of the soybeans. Conversely, an operator positions the header higher off the ground to maximize a harvested yield of wheat, for example.

Figure 2:
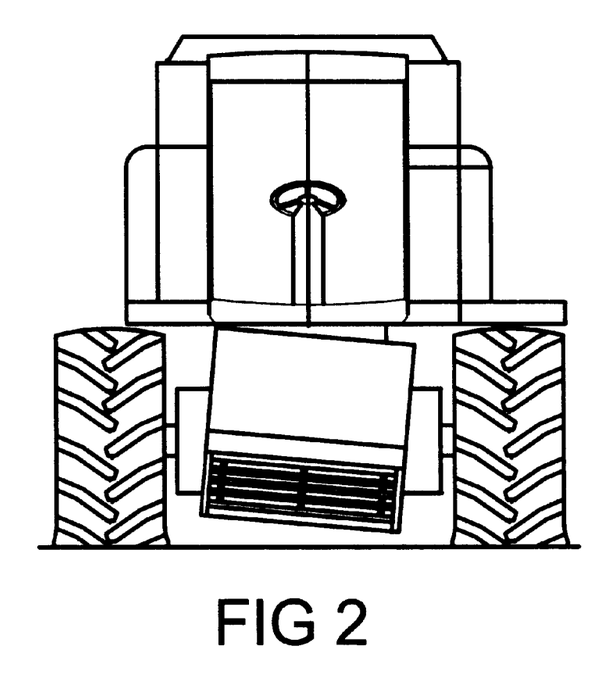
FIG. 2 is a front view of the harvester with the feeder in a tilted position according to the field tracking control system of the present invention.
Figure 3A:
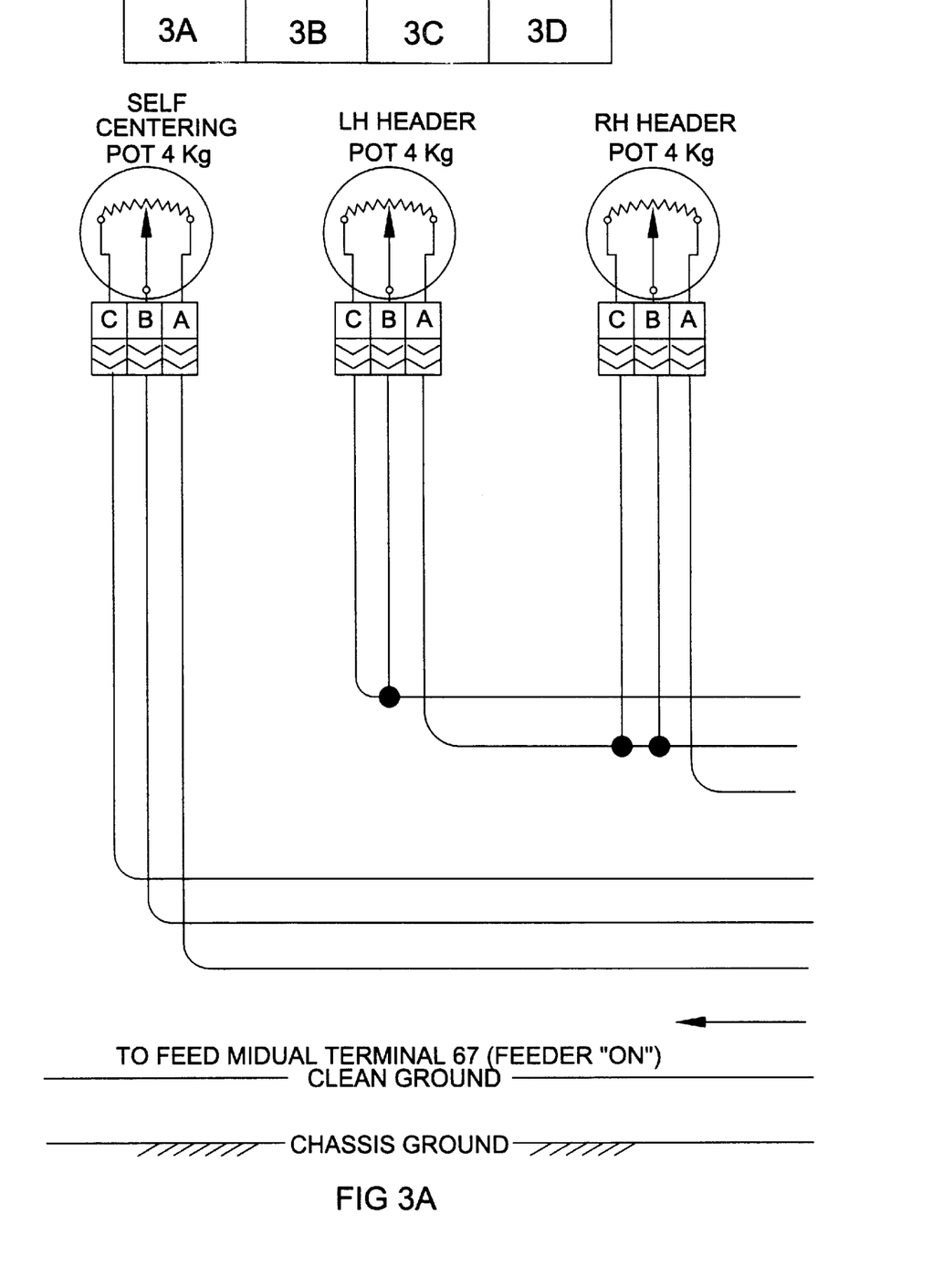
FIGS. 3A–3D are a wiring schematic of the field tracking control system of the present invention.
Figure 3B:
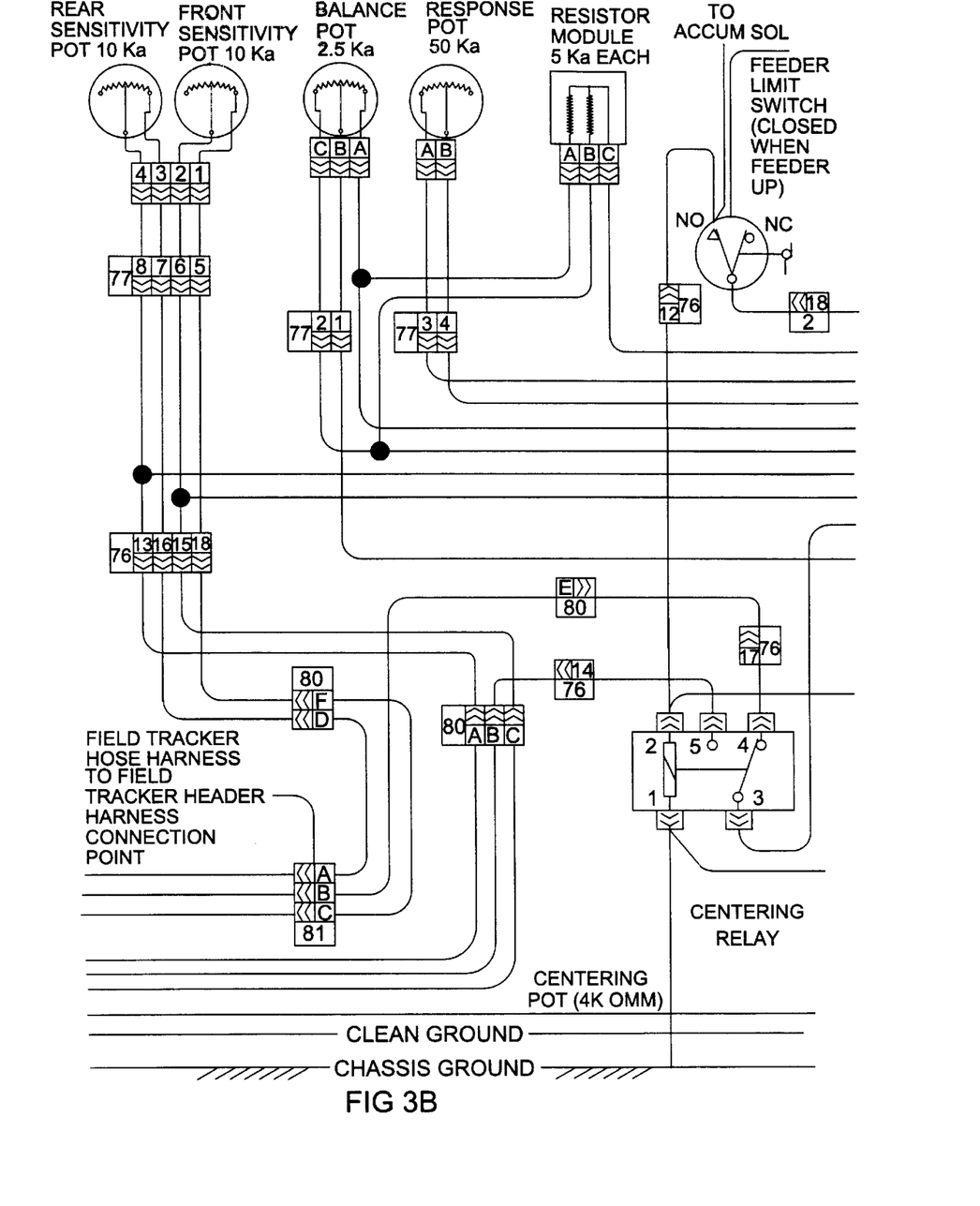
Figure 3C:
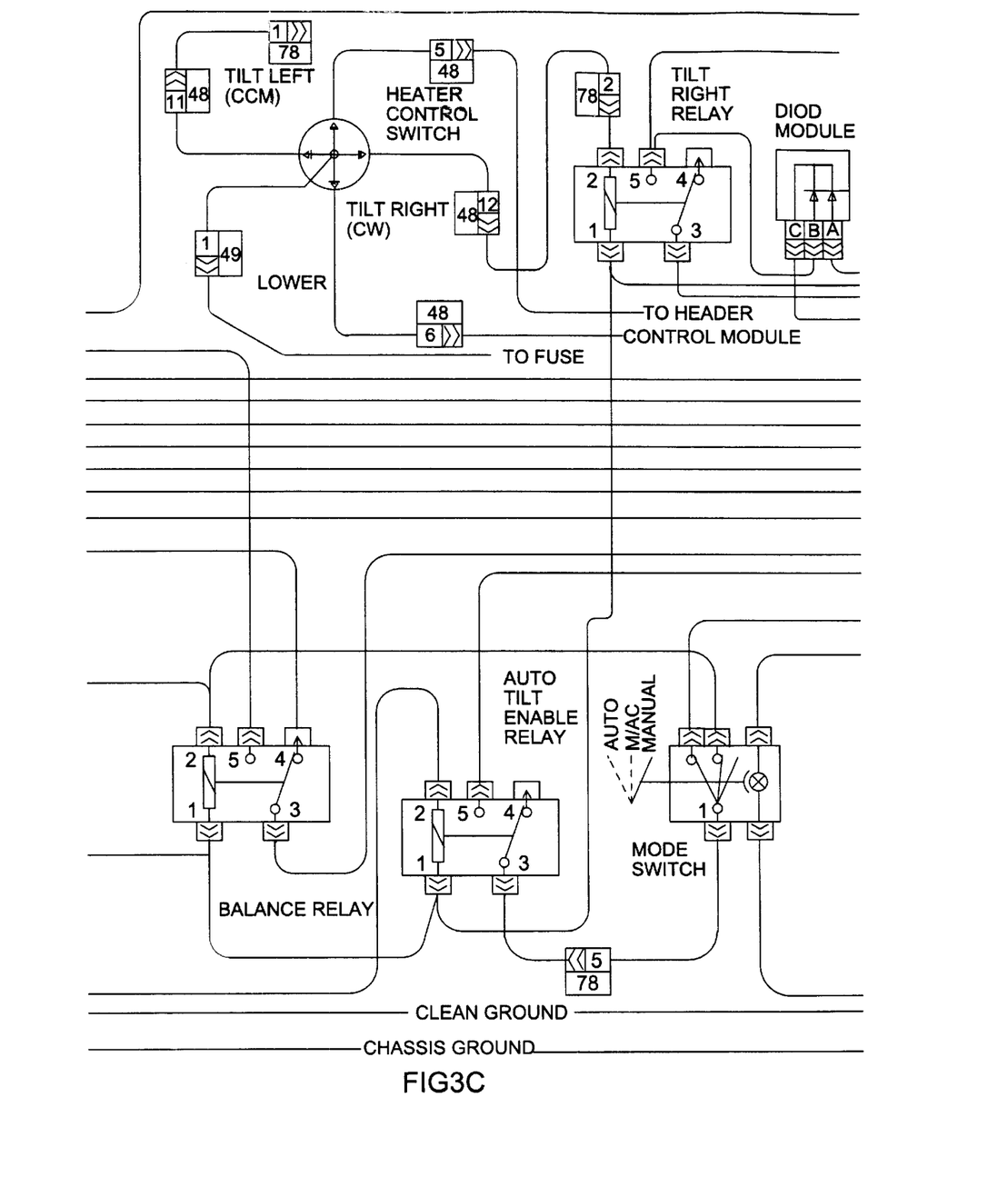
Figure 3D:
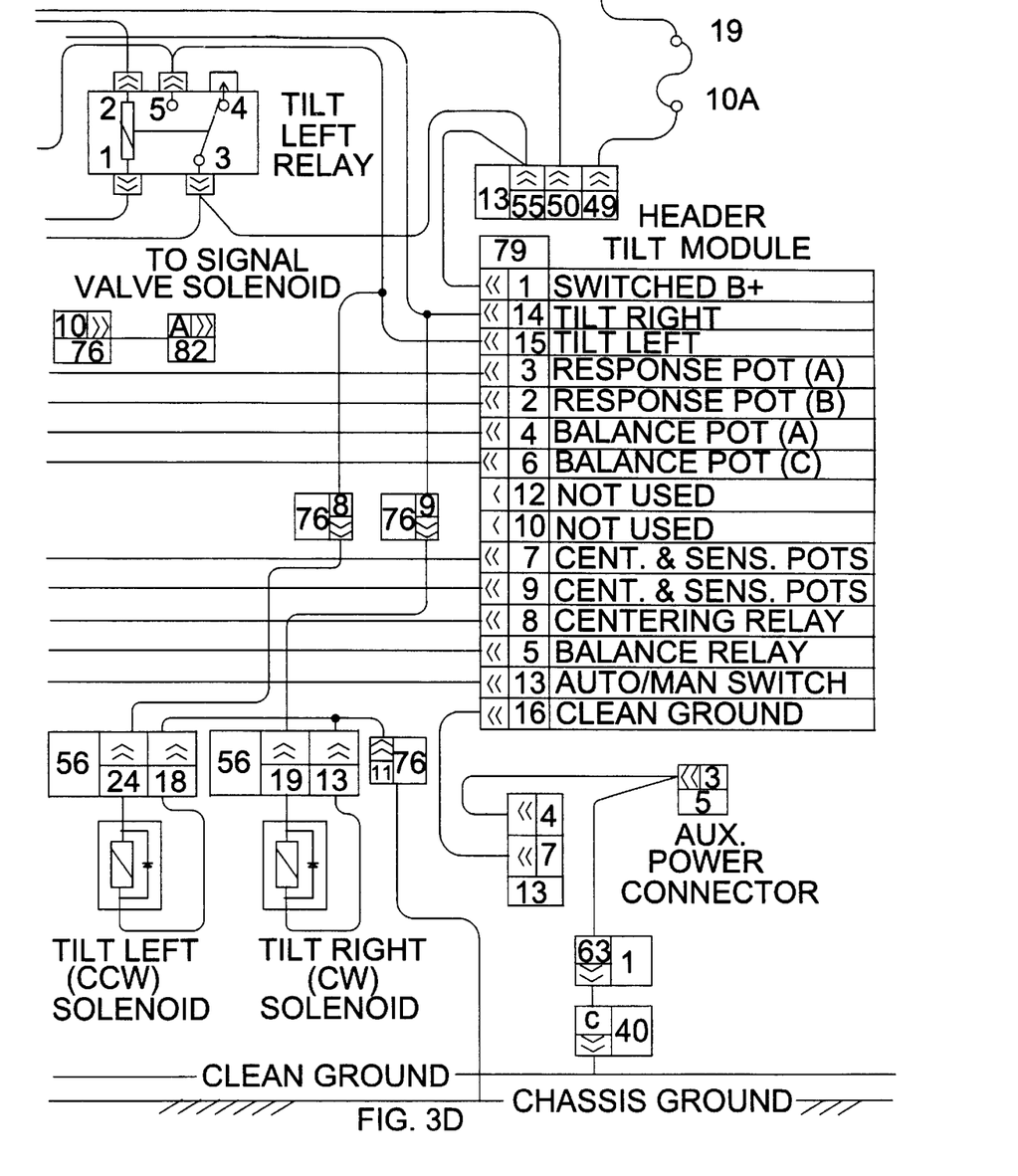

To position the header higher off the ground, the operator operates the present field tracking control system in either the manual or manual/autocenter modes. According to both modes, the operator manually controls the tilt of a feeder adapter 12 to follow the terrain of the field. Referring to FIG. 2, when header operation occurs in the manual mode, as the operator raises the feeder, the feeder adapter 12 and the header remain in the tilted position with respect to the frame of the harvester 10. Thereafter, the operator must utilize controls to level the header to prepare for the next run.

Determination of when the header is level can be difficult since the operator must manually position the feeder adapter 12 from his seat in the cab 14. Conversely, as shown in FIG. 1, when header operation occurs in the manual/auto-center mode, as the operator raises the feeder, the field tracking control system of the present invention automatically levels the header to level the harvester.

Referring now to FIGS. 3A–3D, the field tracking control system includes a mode switch 16 that the operator uses to select among harvesting modes. Preferably, the mode switch 16 is located in the cab 14 of the harvester 10 and is easily accessible to the operator. As discussed above, the operator typically chooses a mode according to the type of crop being harvested. In the preferred embodiment, the mode switch 16 enables automatic, manual, and manual/auto-center modes. It can be appreciated, however, that different applications may utilize other combinations of modes, e.g., by eliminating the manual mode.

To operate the present field tracking control system in the manual mode, power is supplied via line B+ to a header tilt control module 18 (terminal 1), a tilt left relay 20 (terminal 3), and a tilt right relay 22 (terminal 3). The header tilt control module 18 is a controller, such as Case Corporation Part Number 100275A, incorporated by reference herein, which is available from Case Corporation distributors and agricultural dealers, for example, Birkey's Farm Store located in Urbana, Illinois. The header tilt control module 18 is responsible for making the present field tracking control system react based on operator adjusted control settings and electrical signals received from the header. Preferably, the header tilt control module 18 (terminal 16) is grounded to a clean ground, and not to a chassis of the harvester 10.

When the header tilt control module 18 receives a signal at terminal 13, the header tilt control module identifies that the field tracking is in an automatic mode, not a manual mode. To receive a signal at terminal 13, an auto tilt enable relay 25 must be activated to connect terminal 5-3. The auto tilt enable relay 25 is activated when the feeder is activated. In addition, to receive a signal at terminal 13, the mode switch 16 must create a closed circuit, either at terminal 1 or terminal 5 of the mode switch. Thus, when the mode switch 16 is open, i.e., set to the manual mode, the header tilt control module 18 (terminal 13) will not receive a signal, and the header tilt control module 18 identifies that the field tracking control system is operating in the manual mode.

To adjust a position of the header in the manual mode, the operator uses a header control switch 26 to laterally tilt the feeder right and left, and to raise and lower the feeder. In both the raised and lowered positions, pushing on the right side of the header control switch 26 will cause the feeder to tilt right, i.e., lower a right side of the header, as viewed from the operator's seat. Similarly, pushing on the left side of the header control switch 26 will cause the feeder to tilt left. i.e., lower a left side of the header. The header control switch 26 overrides the manual/auto-center and the automatic modes at all times when activated.

The present field tracking control system uses solenoids, for example, to control the tilt operation of the feeder. Thus, to tilt the feeder left, a tilt left solenoid 28 shifts a spool (not shown) that directs hydraulic oil to a rod end of a field tracking cylinder (not shown), which is located between the feeder housing and the feeder adapter 12 on the harvester. The field tracking cylinder extends and retracts to tilt the feeder side to side, which in turn tilts the header relative to a frame of the harvester 10. To tilt the feeder right, a tilt right solenoid 34 shifts the spool to direct hydraulic oil to a base end of the field tracking cylinder.

Therefore, the operator pushes the header control switch 26 to the right or to the left to energize the tilt right relay 22 (terminal 2) or the tilt left relay 20 (terminal 2), respectively. Thereafter, the respective tilt relay 20, 22 shifts, connecting terminal 3-5. When terminal 3-5 is connected, line B+ energizes the respective tilt solenoid 28, 34 and a signal valve solenoid 37 through a diode module 38. The signal valve solenoid 37 is part of the hydraulic system and is used to activate a hydraulic pump (not shown). When energized, the signal valve solenoid 37 sends a pressure signal to the hydraulic pump to ready the pump. The diode module 38 prevents both the tilt right solenoid 22 and the tilt left solenoid 20 from being activated simultaneously.

Therefore, in the manual mode, the operator manually controls the tilt of the header whether the header is in a lowered or raised position. The operator may wish to manually control the tilt of the header when the header is raised to accommodate a hilly terrain, for example. In particular, the operator may wish to manually operate the header in a raised position when the harvester is traveling downhill, but the header is moving uphill because the header has bottomed out along the side of a ditch or ravine. In most situations, however, the operator desires the header to automatically level when raised.

Referring to the manual/auto-center mode, the operator manually controls the feeder adapter 12 when the header is lowered, as described above, but the header is automatically leveled when the operator raises the feeder. In the manual/auto-center mode, terminal 5-3 of the mode switch 16 is connected to a feeder housing limit switch 40 via a centering relay 42 and a balance relay 44. When the feeder is raised and the switch is closed, the feeder housing limit switch 40 connects mode switch 16 (terminal 5-3) to power line B+. Power is directed from line B+ through the automatic tilt enable relay 25 to terminal 13 of the header tilt control module 18 to activate an automatic centering mode of the present field tracking control system. The automatic tilt enable relay 25 is energized via terminal 2 to connect terminal 35 when the feeder is on.

The feeder housing limit switch 40 is located on the feeder, and is closed when the feeder is raised above a predetermined height. Preferably, the operator can adjust the height at which the feeder housing limit switch closes. The feeder housing limit switch 40 is a normally open switch which enables and disables the self-centering function of the manual/auto-center mode and automatic mode based on the header height. When the operator raises the feeder above the predetermined height, the feeder housing limit switch 40 is closed to send power to the header tilt control module 18 (terminal 13) to enable automatic self-centering of the feeder. Conversely, when an operator lowers the feeder below the predetermined height, the feeder housing limit switch 40 opens to cut off power to the header tilt control module 18 (terminal 13), and disable the automatic self-centering operation. Thus, when the operator lowers the feeder, the header is operated manually (as in the manual mode).

To automatically center the header, a self-centering potentiometer 46 is located on the feeder adapter 12. The self-centering potentiometer 46 connects via a linkage (not shown) to the pivoting portion of the feeder adapter 12 to indicate a position of the header relative to the harvester 10. Artisans will appreciate that equivalent electrical components other than the self-centering potentiometer can be used without departing from the essential spirit and scope of the invention.

When an operator raises the feeder above the predetermined height, the centering relay 42 is energized via the feeder housing limit switch 40. When energized, the centering relay 42 shifts to connect terminal 5-3 to electrically connect a self-centering signal sent from the self-centering potentiometer 46 to the header tilt control module 18 (terminal 8). The header tilt control module 18 interprets the self-centering signal to indicate header tilt relative to the harvester.

At the same time, when the feeder housing limit switch 40 is closed, line B+ energizes the balance relay 44. When energized, the balance relay shifts to connect terminal 5-3, and thereby electrically connect a balance signal from a resistor module 48 (terminal C) to the header tilt control module 18 (terminal 5). The balance signal is a fixed potential electrical signal that indicates a center position of the header. The header tilt control module 18 identifies when the header 18 is centered by comparing the self-centering signal from the self-centering potentiometer 46 to the balance signal from the resistor module 48.

Therefore, to center the header, the header tilt control module 18 alternately activates the tilt right solenoid 34 (through terminal 14) and the tilt left solenoid 28 (through terminal 15) as needed according to the compared self-centering and balance signals. As discussed above, when either the tilt right solenoid 34 or the tilt left solenoid 28 is activated, power is also directed to the signal valve solenoid 37 from the corresponding left or right tilt relay 20, 22 (terminal 5) and through the diode module 38. When a value of the selfcentering signal indicates the same value as the balance signal from the resistor module 48, the header tilt control module 18 deactivates the tilt right solenoid 34 or the tilt left solenoid 28, whichever was activated, and the signal valve solenoid 37, to deactivate the hydraulic pump. Upon deactivating the hydraulic pump, the header will be level to the harvester 10.

Referring to the automatic mode, when operating in the automatic mode, line B+ supplies power to the header tilt control module 18 (terminal 1), the tilt left relay 20 (terminal 3), the tilt right relay 22 (terminal 3), and the feeder housing limit switch 40. With the mode switch 16 positioned in the automatic mode, a power supply from terminal 11 of the header tilt control module 18 is directed through the mode switch 16 (terminal 1-3 connected) and the automatic tilt enable relay 25 (terminal 3-5) back to the header tilt control module 18 (terminal 13). The automatic tilt enable relay 28 (terminal 3-5) is activated when the feeder is on.

To enable the automatic self-centering operation upon lifting the header in the automatic mode, the supply power from line B+ is available through the closed feeder housing limit switch 40 to the centering relay 42 (terminal 2). The centering relay 42 shifts to connect terminal 5-3. The self-centering signal from the self-centering potentiometer 46 (through B terminal) indicates the header position via centering relay 42 (terminal 5-3) to the header tilt control module 18 (terminal 8).

In addition, the feeder housing limit switch 40 energizes the balance relay 44 (terminal 2) via line B+ to shift the balance relay 44 and connect terminal 5-3. The resistor module 48 (terminal C) indicates the fixed balance signal, required to center the header, through the balance relay 44 (terminal 5-3) to the header tilt control module 18 (terminal 5).

The header tilt control module 18 compares the self-centering signal and the balance signal, and activates the tilt right solenoid 34 (through terminal 14) or the tilt left solenoid 28 (through terminal 15) as needed to center the header. When the tilt right solenoid 34 or the tilt left solenoid 28 are activated, power is also directed to the signal valve solenoid 37 from the corresponding tilt relay 20, 22 (terminal 5). As discussed above, the diode module 38 prevents both the tilt right and left solenoids 34, 28 from being activated at the same time and sends power to the hydraulic system via the signal valve solenoid 37. When the self-centering signal from the selfcentering potentiometer 46 indicates the same electrical value as the balance signal from the resistor module 48, the header is level to the harvester 10. Thereafter, the header tilt control module 18 deactivates the tilt right solenoid 34, the tilt left solenoid 28, and the signal valve solenoid 37, by de-energizing the tilt left and right relays 20, 22 to disconnect terminal 5-3.

To perform an automatic ground tracking operation, an operator lowers the feeder in the automatic mode below an activation point of the feeder housing limit switch 40. When the operator lowers the feeder past the feeder housing limit switch activation point, the feeder housing limit switch 40 opens, thereby terminating a power supply from line B+ to the centering relay 42 (terminal 2) and the balance relay 44 (terminal 2). The centering relay 42 is de-energized to connect terminal 3-4, and interrupts the electrical signal from the self-centering potentiometer 46 to the header tilt control module 18. Likewise, the balance relay 44 is de-energized to connect terminal 3-4, and interrupts the electrical signal from the resistor module 48 to the header tilt control module 18.

The header tilt control module 18 (terminal 6) directs voltage to a balance potentiometer 50 (terminal C), through the balance potentiometer (terminal C-A), and returns voltage to the header tilt control module 18 (terminal 4). The balance signal from the balance potentiometer 50 (terminal B) is directed through the balance relay 44 (terminals 4-3) to the header tilt control module 18 (terminal 5). This signal indicates an operator selected a level position of the header relative to the ground.

Based on factors such as ground speed, and ground and crop conditions, the operator can utilize sensitivity potentiometers 52, 54 to adjust the rate at which the present field tracking control system reacts to changes in the terrain during the automatic ground sensing mode. At maximum sensitivity, the difference in height relative to the ground between each end of the header is small before the header will tilt. Conversely, at minimum sensitivity a larger difference in header end height from end to end is required before tilting occurs.

In addition, the operator can adjust a response time of the header tilt control module 18 using a response control potentiometer 55 that connects to the header tit control module 18 (terminals 2 and 3). The response control potentiometer 55 adjusts how quickly the field tracking control system of the present invention tilts the feeder when operating in the automatic ground sensitive mode.

During the ground tracking operation, the header tilt control module 18 supplies a high side voltage reference (terminal 9) for the front and rear sensitivity potentiometers 52, 54, and a low side voltage reference (terminal 7) for the front and rear sensitivity potentiometers 52, 54. The high side voltage is directed to a right header potentiometer 56 and the low side voltage is connected through a splice (not shown) to the left header potentiometer 58. The left header potentiometer 58 signals to the header tilt control module 18 the position of the left hand end of the feeder relative to the ground. Similarly, the right header potentiometer 56 signals to the header tilt control module 18 the position of the right hand end of the header relative to the ground.

Thereafter, a combined header signal from the left and right header potentiometers 56, 58 is directed to the centering relay 42 (terminal 4). Therefore, the centering relay 42 (terminal 4-3) electrically connects the combined header signal from the left header potentiometer 58 and the right header potentiometer 56 to the header tilt control module 18 (terminal 8) when the feeder housing limit switch 18 is open, i.e., the header is down, during the automatic ground sensing mode.

To adjust the tilt of the header, the header tilt control module 18 activates the tilt right solenoid 34 (through terminal 14) and the tilt left solenoid 28 (through terminal 15), as needed according to the signals from the centering relay 42 and the balance relay 44. Power is directed to the signal valve solenoid 37 from the corresponding tilt left or right relay 20, 22 (terminal 5) and through the diode module 38 to activate the hydraulic system. The header signal from the left header potentiometer 58 and the right header potentiometer 56 are combined to form a combined signal. To track the ground, the header tilt control module 18 adjusts the feeder adapter 12 until the combined signal indicates the same electrical value as the balance signal from the balance potentiometer 50 at terminal 5 of the header tilt control module 18. Thereafter, the header tilt control module 18 deactivates the tilt right solenoid 34, the tilt left solenoid 28, and the signal valve solenoid 37.

From the foregoing description, it should be understood that an improved field tracking control system has been shown and described which has many desirable attributes and advantages. The present control system is adapted to allow an operator to manually control the lateral angle of the header while harvesting a row of crops, and at the end of each run automatically level the header to the harvester when the header is raised.

Other alterations and modification will be apparent to those skilled in the art. Accordingly, the scope of the invention is not limited to the specific embodiments used to illustrate the principles of the invention. Instead, the scope of the invention is properly determined by reference to the appended claims and any legal equivalents thereof.

What is claimed is:

1. A control system for an agricultural harvester having a frame and a header, the header being attached via a feeder adapter to a feeder housing which connects the header to, and supports the header from, the harvester, a position of the feeder adapter being adjustable relative to the frame of the harvester, the control system comprising:
   a self-centering sensor positioned such that it produces a selfcentering signal corresponding to a lateral tilt position of the feeder adapter relative to the frame;
   a balance sensor that produces a signal corresponding to the header being level relative to the frame;
   a header tilt control module electrically connected to said selfcentering sensor and said balance sensor, wherein the header is manually controlled when the feeder housing is located in a first lowered position relative to the ground, and when said feeder housing is located in a second raised position relative to the ground, said header tilt control module compares said centering signal and said balance signal to automatically level the header relative to the frame of the harvester; and
   a mode switch for selecting at least one mode of operation regarding control of the header, said at least one mode implementing both manual operation of the header when the feeder housing is located in said first lowered position and automatic leveling of the header relative to the frame when the feeder housing is located in said second raised position.

2. The control system according to claim 1, wherein said self-centering sensor is a potentiometer.

3. The control system according to claim 1, wherein said balance sensor is a resistor having a fixed value.

4. The control system according to claim 1, further including:
   a centering relay that when energized electrically connects said self-centering sensor to said header tilt control module; and
   a balance relay that when energized electrically connects said balance sensor to said header tilt control module.

5. The control system according to claim 4, further including a feeder housing limit switch located to provide power to energize said centering relay and said balance relay when the feeder is raised above a predetermined height.

6. The control system according to claim 4, further including:
   a left header sensor located near the left end of the header that sends a left header signal to indicate a position of said left end of the header relative to the ground;
   a right header sensor located near the right end of the header that sends a right header signal to indicate a position of the said right end of the header relative to the ground, wherein said left header sensor and said right header sensor are electrically connected to said centering relay to connect to said header tilt control module when said centering relay is de-energized.

7. The control system according to claim 6, further including a balance potentiometer that indicates a balance potentiometer signal, said balance potentiometer being electrically connected through said balance relay to said header tilt control module only when said balance relay is de-energized.

8. The control system according to claim 7, wherein said header tilt control module compares said left header signal and said right header signal to said balance potentiometer signal to control a header position relative to the ground during an automatic ground sensing mode.

9. The control system according to claim 1, further including hydraulics for tilting the header left and right relative to the frame of the harvester.

10. The control system according to claim 9 wherein said hydraulics further includes:
    a tilt left solenoid for directing fluid to a first end of a field tracking cylinder; and
    a tilt right solenoid for directing fluid to a second end of the said field tracking solenoid,
    wherein said header tilt control module alternately activates said tilt left solenoid and said tilt right solenoid according to said comparison of said centering signal and said balance signal to center the header relative to the frame of the harvester.

11. The control system according to claim 10, further including a diode module for preventing both said tilt left solenoid and said tilt right solenoid from being activated at the same time.

12. The control system according to claim 11, further including a header control switch electrically connected to said tilt left solenoid and said tilt right solenoid for manually controlling a tilt of the feeder adapter relative to the frame of the harvester.

13. A control system for an agricultural harvester having a frame and a header, the header being attached via a feeder adapter to a feeder housing which connects the header to, and supports the header from, the harvester, a position of the feeder adapter being adjustable relative to the frame of the harvester, the control system comprising:

a header tilt control module that operates to level the header relative to the frame of the harvester, wherein said header tilt control module operates to automatically level the feeder adapter to the harvester when the feeder housing is located above a predetermined height and the header is operated manually when the feeder housing is located below said predetermined height;

a feeder housing limit switch located to power said header tilt control module to indicate said automatic leveling operation when the feeder is raised;

a self centering sensor located on the feeder adapter that indicates a self-centering signal corresponding to a position of the header relative to the frame of the harvester; and a balance resister that indicates a fixed balance signal corresponding to the header being level relative to the frame of the harvester;

a mode switch for selecting at least one mode of operation regarding control of the header, said at least one mode implementing both said manual operation and said automatic leveling of the header;

wherein said header tilt control module is electrically connected to said self centering sensor and said balance sensor to compare said self-centering signal to said balance signal, and controls a position of the header to level the header relative to the frame of the harvester based upon said comparison.

* * * * *

UNITED STATES PATENT AND TRADEMARK OFFICE
CERTIFICATE OF CORRECTION

PATENT NO.   : 6,615,569 B1
DATED        : September 9, 2003
INVENTOR(S)  : Randall J. Carlz It is certified that error appears in the above-identified patent and that said Letters Patent is hereby corrected as shown below:

Column 7,
Line 66, delete "selfcentering" and substitute -- self-centering -- in its place.

Column 8,
Line 4, delete "selfcentering" and substitute -- self-centering -- in its place.

Signed and Sealed this

Tenth Day of August, 2004

JON W. DUDAS
*Acting Director of the United States Patent and Trademark Office*